(12) United States Patent
Gutin et al.

(10) Patent No.: US 6,816,656 B2
(45) Date of Patent: Nov. 9, 2004

(54) METHOD AND DEVICE FOR HANDLING OPTICAL PULSE SIGNALS

(75) Inventors: Michael Gutin, Petach Tikva (IL); Uri Mahlab, Yehuda (IL); Boris Malomed, Gan-Yavneh (IL)

(73) Assignee: ECI Telecom Ltd., Petach Tikva (IL)

( * ) Notice: Subject to any disclaimer, the term of this patent is extended or adjusted under 35 U.S.C. 154(b) by 0 days.

(21) Appl. No.: 09/927,349

(22) Filed: Aug. 13, 2001

(65) Prior Publication Data

US 2002/0150362 A1 Oct. 17, 2002

Related U.S. Application Data

(63) Continuation-in-part of application No. 09/780,572, filed on Feb. 12, 2001.

(51) Int. Cl.⁷ .................................................. G02B 6/00
(52) U.S. Cl. ..................................................... 385/122
(58) Field of Search ........................... 385/122; 372/21, 372/25

(56) References Cited

U.S. PATENT DOCUMENTS

| | | | |
|---|---|---|---|
| 5,166,942 A | 11/1992 | Cardimona et al. | |
| 5,172,258 A | 12/1992 | Verber | |
| 5,278,930 A | 1/1994 | Chikuma et al. | |
| 5,570,438 A | * 10/1996 | Fontana et al. | ............... 385/24 |
| 5,815,519 A | * 9/1998 | Aoshima et al. | ............. 372/25 |
| 6,047,011 A | 4/2000 | Cook | |
| 6,178,035 B1 | 1/2001 | Eda et al. | |
| 2002/0003440 A1 | * 1/2002 | Qian et al. | ..................... 327/21 |

FOREIGN PATENT DOCUMENTS

| | | |
|---|---|---|
| JP | 2000-147579 A | 5/2000 |
| WO | WO 00/49458 | 8/2000 |
| WO | WO 00/49458 A1 | 8/2000 |

OTHER PUBLICATIONS

Patent Abstract, of CN1045282A entitled "Growing Low Temperature Phase–Deviation Barium Borate Monocrystal by Smelting Salt Crystal Meth . . . " applicant: Fujian Material Construction Inst., Chinese Acadamey of Sciences, published Sep. 12, 1990.

Patent Abstract of SU 1365932 A1, entitled "Non Linear Optical Wave Guide", applicant People's Frendship University, published Aug. 10, 1999.

Takatomo, Sasaki, Higher Harmonic Laser Beam Generating Apparatus, Generated Document: Patent Abstracts of Japan, Application No.: 07007565, Application date: Sep. 8, 1996, Publication No.: 08201862A.

(List continued on next page.)

Primary Examiner—Euncha P. Cherry
(74) Attorney, Agent, or Firm—Browdy and Neimark, P.L.L.C.

(57) ABSTRACT

A technique for handling an optical pulse signal, wherein the handling includes one or more operations out of: pulse shaping, treatment of nonlinearity and monitoring; the technique uses a device capable of performing a cascaded second harmonic generation (SHG) with respect to a particular fundamental harmonic (FH), and comprises:

- selecting in the device a particular optical path length suitable for performing at least one of the above operations with respect to an incoming optical pulse signal carried by a wavelength defined by the particular fundamental harmonic (FH),
- conveying the incoming optical pulse signal carried by the defined wavelength along the selected optical path in the device,
- obtaining from the device an output optical pulse signal at the fundamental harmonic (FH), wherein the treatment of nonlinearity and/or the pulse shaping are performed, and/or obtaining an output optical pulse signal at the second harmonic (SH) for further monitoring it and judging about the input optical pulse signal.

37 Claims, 8 Drawing Sheets

OTHER PUBLICATIONS

Bang, Ole, Balslev, Carl Balslev, Christiansen, Peter L., Engineering Competing Nonlinearities; Optics Letters ; Oct. 15, 1999/vol. 24, No. 20.

Stegeman, G.I., Hagan, D.J., Torner, L. Optical and Quantum Electronics, Aug. 22, 1996.

Etrich, Christoph, Lederer, Falk, Malomed, Boris A., Peschel, Thomas, Peschel, Ulf, Optical Solitons in Media with a Quadratic Nonlinearity, Institute of Solid State Theory and Theoretical Optics, Friedrich–Schiller–University Jena, Max–Wien–Platz1, D–07743 Jena, Germany; Department of Interdisciplinary Studies, Faculty of Engineering, Tel Aviv University, Tel Aviv 69978, Israel.

Zhang et al., "Pulse Shaping of Ultrashort Laser Pulses with Nonlinear Optical Crystals", *Jpn. J. Appl. Phys.*, Nov. 1999, p. 6351–6358, vol. 38, Publication Board, Japanese Journal of Applied Physics.

Paré et al., "Split Compensation of Dispersion and Self–Phase Modulation in Optical Communication Systems", *Optics Communications*, Feb. 1, 1999, p. 130–138, vol. 160, Elsevier Science B.V.

Michael Gutin et al. "Shaping NRZ Pulses and Suppression of the Inter–Symbol Interference by a Second–Harmonic–Generating Module" Pgs.

* cited by examiner

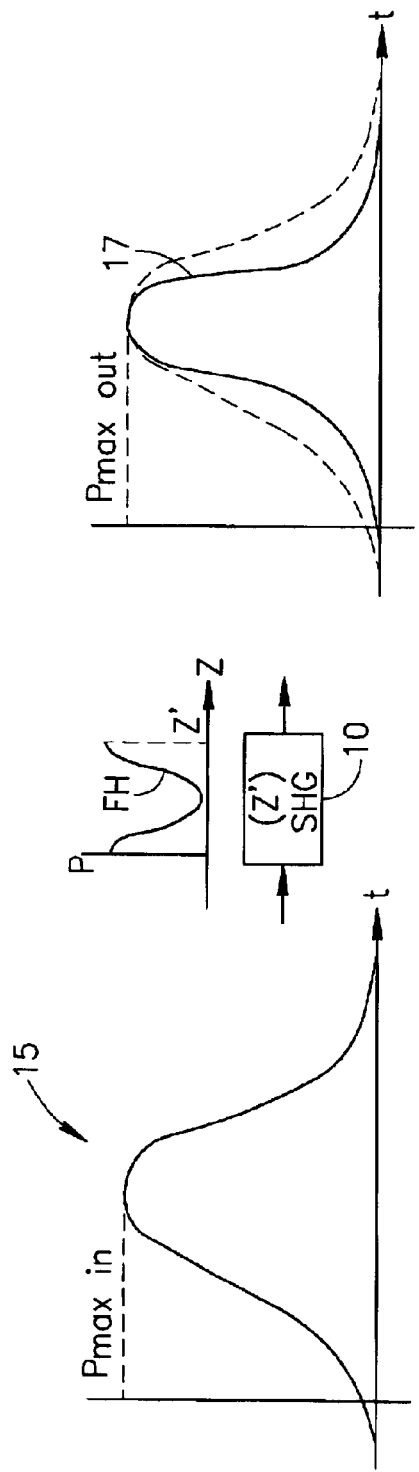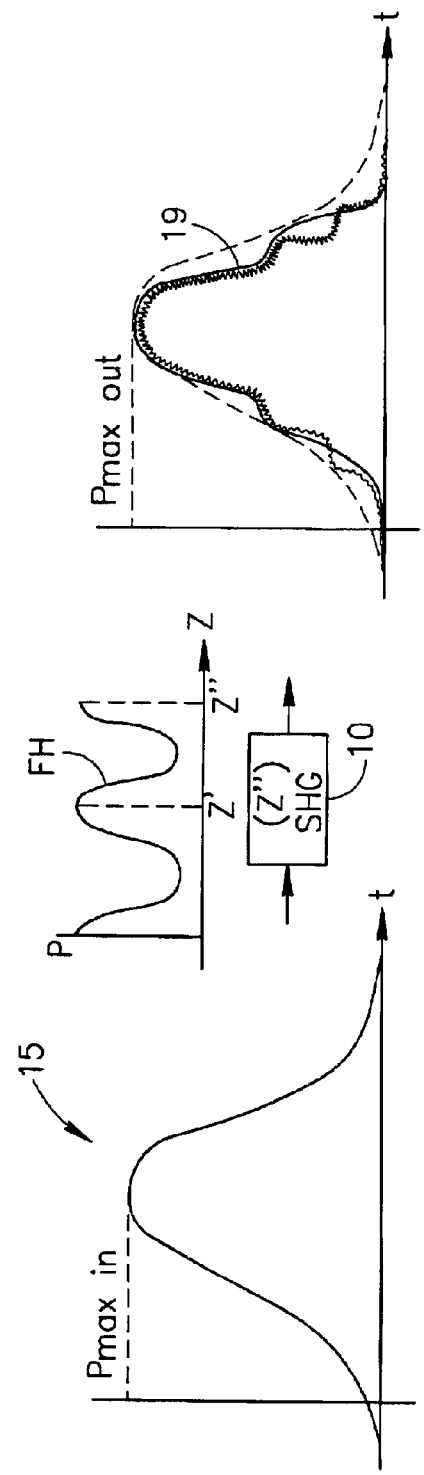

METHOD AND DEVICE FOR HANDLING OPTICAL PULSE SIGNALS

FIELD OF THE INVENTION

The present invention relates to a technology for pulse shaping, treatment of non-linearity and monitoring in optical communication networks, preferably in optical fiber links. The present invention is a Continuation-In-Part to a U.S. patent application Ser. No. 09/780,572, filed Feb. 12, 2001.

BACKGROUND OF THE INVENTION

Three basic physical factors, that are known as limiting the achievable bit-rate in optical communication links, are chromatic dispersion, power losses and non-linearity. It is well known that power losses can be compensated by all-optical Erbium-doped or Raman amplifiers periodically installed into a long fiber link. Dispersion can also be compensated by means of periodically inserted relatively short elements with the opposite sign and large absolute value of the dispersion, which makes it possible to have the average dispersion nearly equal to zero. As such dispersion-compensating elements, a specially fabricated fiber, or very short pieces of a fiber with the Bragg grating written on it, may be used.

Nonlinearity, which manifests itself as a nonlinear phase shift accumulated by a light signal while being transmitted via an optical fiber, is generated by the so-called Kerr effect in glass. Owing to this effect, the refraction coefficient of the optical material changes with the intensity of the optical signal according to the following formula:

$$n = n_0 + K|E|^2, \quad (1)$$

where K is the Kerr coefficient.

WO 00/49458-A1 describes a method and an apparatus for compensating optical non-linearity in optical devices and transmission systems. Two second order interactions are cascaded in phase-mismatched second harmonic generation to accumulate a non-linear phase shift of a fundamental wave. The non-linear phase shift can be set to provide a desired amount of non-linearity compensation. Compensation takes place in a compensating medium having a negative effective non-linear refractive index at the design operating conditions of the compensating medium. Compensators incorporating these principles may be incorporated as passive or active components in optical transmitters, repeaters or receivers. Active components may be tuned by varying the operating condition of the compensating medium, for example by controlling temperature or applied stress. Embodiments of the invention use the compensator as pre- or post-compensators in an optical amplifier, to eliminate or reduce self-phase modulation in the optical amplifier that occurs as a result of the Kerr effect.

C. Pare et al. in their paper "Split compensation of dispersion and self-phase modulation in optical communication systems" (Optics Letters, 1 Apr. 1996, Vol 21, No. 7, p. 459–461, Opt. Soc. of America) discuss an idea of alternating the sign of the non-linearity along with the sign of the local dispersion by using a (generally, unspecified) medium exhibiting simultaneously a negative Kerr coefficient and specially tailored dispersion. The authors briefly mention that available non-linear media with a negative Kerr coefficient may be semiconductor wave-guides or media utilizing the cascading mechanism. The authors further point out that, though these materials are only available in the form of short samples with the size ~1 cm, the non-linearity of the media might be strong enough to compensate for kilometers of low fiber non-linearity, using pre-amplification if necessary.

It is necessary to note that their estimate was too optimistic: in fact, the semiconductor wave-guides are not acceptable at all, due to the strong two-photon absorption in them; as for the SHG materials, a realistic estimate shows that, in order to compensate the non-linear phase shift accumulated in a typical span of the fiber ~50 km long, the necessary optical path in the second-harmonic-generating material must be no less than ~5 m.

According to one possible way of the full signal restoration discussed in the paper, the dispersion compensation and negative Kerr effects must occur simultaneously, using, for example, a grating structure created on a non-linear wave-guide with a negative Kerr coefficient. Another possible way proposed in the article was to split the compensation process, i.e., the dispersion compensation can be applied first and then, in the next step, the Kerr-induced non-linear effects would be cancelled.

The SHG media known in the art can be represented, inter alia, by nonlinear optical crystals capable of producing higher harmonics of an optical signal from its fundamental harmonic. Such crystals, for example potassium titanyl phosphate (KTP), potassium dihydrogen phosphate (KDP), barium borate optical crystals (BBO) and the like have found their use in various types of laser generators. Examples of such systems can be found in JP 08201862 A2, U.S. Pat. No. 6,047,011, and others.

Notwithstanding the possible degree of the compensation of the dispersion and nonlinearity, they cannot be completely neglected, as they alter the shape of pulses on which the standard non-return-to-zero (NRZ) format of the data transmission in fiber-optic links is based. Ideally, a pulse representing a "one" bit of data must have a rectangular shape. In reality, the nonlinearity and dispersion convert it into a smoothed signal which is usually close to a Gaussian. The deviation of the data-carrying pulses from the ideal rectangles gives rise to problems produced by overlapping of their extended "tails" belonging to adjacent pulses. The tail overlapping of such tails may give rise to the appearance of parasitic maxima between the "one"-bits, which poses an additional factor limiting the achievable bit-rate, known as inter-symbol interference (ISI). While a partial solution to this problem may be provided by the above-mentioned dispersion compensation, only strong reshaping of the Gaussian pulses (i.e., periodic restoration of the desired near-rectangular form) would provide for a complete solution of the ISI problem.

T. Zhang and M. Yonemura, in the paper "Pulse Shaping of Ultrashort Laser Pulses with Nonlinear Optical Crystals" in Jpn.J.Appl.Phys., Vol. 38 (1999), pp.6351–6358, describe a technique which uses a time-delay optical crystal and a Type-II KDP optical crystal for pulse shaping of a set of two ultrashort pulses carried by the fundamental harmonic. In order to achieve pulse shaping, the interacting pulses must first satisfy the condition that the group velocity of the second-harmonic wave is close to the average group velocity of the two fundamental-harmonic pulses. If this condition is met, pulse shaping is possible by correctly selecting the fundamental intensity, intensity balance, delay time and crystal thickness.

Neither of the above-mentioned references propose a practical method/device for pulse shaping and compensation of non-linearity in fiber-optic links having various lengths, values of the fiber etc.

Further, there is a known technique for monitoring of optical pulse transmission by splitting the pulse signal and obtaining information on the transmission parameters from a minor split out portion of the signal.

OBJECT OF THE INVENTION

It is the objective of the invention to provide a method, a device and a system for pulse shaping, control of non-linearity and/or monitoring in telecommunication fiber links.

SUMMARY OF THE INVENTION

According to a first aspect of the invention, the above object can be achieved by providing a method for handling an optical pulse signal, the handling including at least one of operations for: pulse shaping, treatment of nonlinearity and monitoring, the method comprising steps:

providing a signal handling device capable of performing a cascaded second harmonic generation (SHG) with respect to a particular fundamental harmonic (FH), selecting an optical path length in said signal handling device, suitable for performing at least one of said operations with respect to an incoming optical pulse signal carried by a wavelength defined by said particular fundamental harmonic (FH), conveying the incoming optical pulse signal carried by said wavelength along the selected optical path in said signal handling device, obtaining from said signal handling device at least one output optical pulse signal from a list comprising:
 an output optical pulse signal at the fundamental harmonic (FH), wherein the treatment of nonlinearity and/or the pulse shaping are performed,
 an output optical pulse signal at the second harmonic (SH) for further monitoring it and judging about said input optical pulse signal.

In one preferred version of the method enabling performing the operation of nonlinearity treatment, the method comprises selecting such an optical path length for conveying the incoming optical pulse signal with a known amplitude via the signal handling device, that is substantially close to the length upon passing which the output optical pulse signal at the fundamental harmonic (FH) reaches the maximum peak power.

In another preferred version of the method, ensuring performing the operation of pulse shaping, the method comprises selecting such an optical path length for conveying the incoming optical pulse signal with a known amplitude via the signal handling device, that is substantially close to the shortest optical path length upon passing which the output optical pulse signal at the fundamental harmonic (FH) reaches the maximum peak power.

In yet a further version of the method, allowing for the monitoring operation, the method comprises selecting such an optical path length for conveying the incoming optical pulse signal via the signal handling device, enabling obtaining from said device the output optical pulse signal at the second harmonic (SH) with a non-zero peak power for monitoring the incoming optical pulse signal carried by the fundamental harmonic (FH).

Principles of selecting the optical path length will be explained in the detailed description of the invention.

To obtain a required optical path length, the method preferably comprises passing the signal along a multi-segment trajectory in said device, thereby arranging an extended optical path.

One possibility to attain the selected optical path length is to convey the incoming optical pulse signal via a multi-segment "zig-zag" trajectory by arranging one or more internal reflections in the signal handling device.

In the method, the signal handling device is based upon an element selected from the following non-exhaustive list including: a second harmonic generating (SHG) optical crystal and a second harmonic generating (SHG) polymer fiber, both known as elements producing nonlinearity or non-linear phase shift.

According to the most preferred version of the method, it further comprises a step of ensuring that the sign of the Kerr effect created by said element to said wavelength defined by the fundamental harmonic is negative. In this case, the method enables the nonlinearity treatment in the form of compensation of the positive nonlinearity usually accumulated in said incoming optical pulse signal due to conventional positive Kerr effect of optical fibers.

It should be emphasized that, unlike the nonlinearity compensation, the pulse shaping and the monitoring can be achieved by using the device producing nonlinearity of any sign. Likewise, a positive nonlinearity adjustment being a specific case of the nonlinearity treatment is provided, when necessary, using the device inducing the positive Kerr effect.

The method is most efficient for gradual compensation of the nonlinearity and/or gradual pulse shaping in the fiber optic link with optional simultaneous signal monitoring, and comprises an additional step of conveying the outgoing optical signal via a chain including at least one additional signal handling device, and wherein the devices in the chain are spanned by sections of the optical fiber link. In other words, if more than one said devices are inserted in the link and spaced from one another, each of them will contribute to the optical signal handling from the point of nonlinearity treatment, pulse shaping and/or signal monitoring.

By selecting the kind of the device(s), the total length of the optical path in said one or more device(s), and lengths of said one or more sections of the optical fiber link, the obtained results of the signal handling can be adjusted.

The proposed method is also applicable to a case of multi-channel transmission of optical data, where each of the optical channels transmits a specific optical signal at a particular optical wavelength. Usually, the SHG devices are capable of generating second harmonics to a limited spectral range of respective fundamental harmonics defined by wavelengths close to one another. Therefore, the method may be applied to the WDM (Wavelength Division Multiplexing) transmission format, where wavelengths of the optical channels slightly differ from each other.

The proposed method can be utilized in a multi-channel transmission system by performing operations of the basic method with respect to each particular optical channel.

According to one version, the optical pulse signals of different said optical channels are applied to and conveyed via respective different said signal handling devices.

In an alternative version of the method, it comprises conveying the optical pulse signals of different channels via one and the same common signal handling device.

In a further, more promising version, the optical pulse signals of different said optical channels are applied and conveyed via respective different layers of one and the same common pulse treatment device.

The last two versions are suitable for such transmission formats where the wavelengths of different optical channels are close to one another, and provided that the common signal handling device performs its SHG cascaded function in response to the wavelength of each of said multiple optical channels.

If results of the pulse treatment are nonuniform for different optical channels in the multi-channel transmission (which is usually the case), optical channels with better results (say, better compensation of nonlinearity/more effective pulse shaping) can be used for transmitting information having higher priority.

In accordance with a second aspect of the invention, there is provided a device for handling an optical pulse signal from the point of at least one of the following operations: pulse shaping, treatment of nonlinearity and signal monitoring, the device being capable of performing a cascaded second harmonic generation (SHG) with respect to a particular fundamental harmonic (FH), the device being characterized by such an optical path length selected for an incoming optical pulse signal carried by a wavelength defined by said particular fundamental harmonic (FH), that upon conveying said incoming optical pulse signal along the selected optical path, the device enables obtaining at least one output optical pulse signal from a list comprising:

an output optical pulse signal at the fundamental harmonic (FH), wherein the treatment of nonlinearity and/or the pulse shaping are performed, an output optical pulse signal at the second harmonic (SH) suitable for further monitoring and judging about said input optical pulse signal.

The signal handling device comprises a second-harmonic-generating (SHG) element, preferably constituting an SHG optical crystal selected from a non-exhaustive list comprising KTP, KDP and BBO.

It should be noted that the Inventors are first to propose design of a device for handling an optical pulse signal, if applied at a particular wavelength, from the point of at least one of the following operations: pulse shaping, treatment of nonlinearity and signal monitoring, wherein the device comprising an SHG element for performing a cascaded Second Harmonic Generation with respect to a Fundamental Harmonic (FH) defined by said particular wavelength, said element being covered by mirror surfaces at least at its two opposite facets and leaving at least two windows at said opposite facets for an incoming optical beam and an outgoing optical beam respectively, the arrangement being such to arrange one or more internal reflections of the optical beam if passing between said two windows, thereby providing an extended optical path.

The extended optical path preferably has a length enabling obtaining an outgoing optical pulse signal on the fundamental harmonic (FH) with a peak power close to maximum and/or an outgoing optical pulse signal on the second harmonic (SH) with a non-zero peak power.

According to one specific implementation, the element (preferably the SHG crystal) has a cubic form and is covered at its two opposite facets by mirror surfaces (for internal reflection), leaving two windows at said opposite facets for an incoming optical beam and an outgoing optical beam respectively, the windows being arranged to obtain an extended optical path of the optical beam through the crystal.

In the preferred embodiment of the device, it is adapted for altering the total length of the multi-segment trajectory, thereby enabling adjustment of the nonlinearity compensation, of the pulse shaping, and/or possibility of the signal monitoring. To this end, the device may have more than two optical ports for incoming and outgoing beams, thus enabling selection and activation of any pair of such ports for a specific length of the trajectory. Alternatively or in addition, the device may be provided with collimators associated with the optical ports and serving for adjusting the incident angle of the light beam.

The device may be utilized for signal handling in a multi-channel transmission format, wherein each of the channels transmits an optical signal at a particular wavelength, said device being capable of Second Harmonic Generation with respect to the wavelengths of more than one channels of said format.

According to one particular embodiment, the pulse treatment device having the SHG property with respect to wavelengths of a number of the multiple optical channels is divided into a number of layers for respectively conveying there-through optical signals of the different optical channels. Ideally, the device serves all the multiple channels.

This embodiment is suitable for the WDM transmission format where the wavelengths of different optical channels are close to one another, (and provided that the common pulse treatment device performs its SHG property in response to at least a number of wavelengths of the respective multiple optical channels).

The layers may be separated either geometrically, or physically, say by optical gratings serving to prevent wavelengths of adjacent optical channels from passing via a particular layer. Actually, such physical separating means provide wavelength filtering.

The device is preferably integrated with an optical amplifier and is preferably placed immediately after said amplifier. The amplifier is usually utilized for adjusting the amplitude of the pulse applied to the device. In practice, the proposed device may form part of an optical network node.

According to an additional aspect of the invention, there is also provided a method for designing a signal handling device, which will be described, with the aid of drawings, in the detailed description of the invention.

Finally, there is proposed a suitable system for handling signals passing via optical fiber links from the point of pulse shaping, nonlinearity treatment and/or monitoring, the system comprising two or more signal handling devices as defined above, inserted in one or more optical fiber links and operative to perform pulse shaping, nonlinearity treatment and/or monitoring with respect to at least an optical pulse signal transmitted via one optical channel.

Adjustment of the systems' operation can be achieved by a) reconfiguring the signal handling devices (selecting input-output ports, regulation of the collimators, etc.);

b) introducing additional devices or removing excessive devices;

c) changing distances between the devices and other elements of the link(s).

Further aspects and details of the invention will become apparent from the following description.

BRIEF DESCRIPTION OF THE DRAWINGS

The invention will further be described with reference to the attached non-limiting drawings, in which:

FIG. 2a schematically illustrates effective results of the pulse shaping function of the SHG device.

FIG. 2b schematically illustrates counter-effective results of the pulse shaping function of the SHG device.

DETAILED DESCRIPTION OF THE INVENTION

Figure 1A:
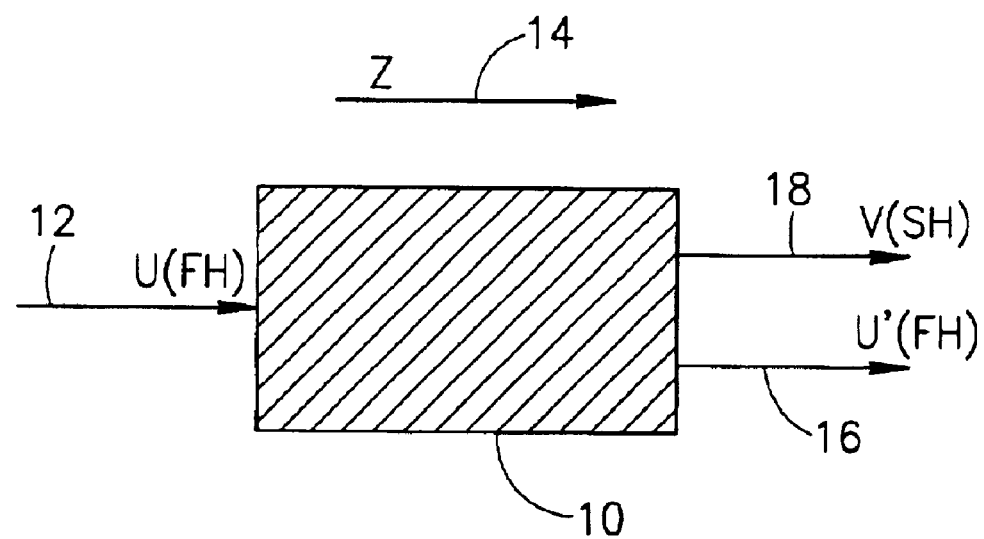
FIG. 1a (prior art) is a schematic illustration of a non-linear (SHG) element capable of producing a second harmonic from a fundamental harmonic of the applied optical signal.

In the frame of the present application, three techniques using a novel so-called signal handling device are described, which have been proposed by the Inventors.

On one hand, the Inventors propose a method for regulating nonlinearity, usually and preferably—for compensation of a regular positive nonlinearity in an optical communication link by introducing in said link one or more so-called pulse treatment devices capable of producing an artifical negative nonlinearity for an optical signal passing there-through.

The communication link is an optical fiber link serving for transmitting there-through one or more optical signals using, respectively, one or more optical wavelengths.

Examples of the above-mentioned pulse treatment devices can be found in the following non-exhaustive list comprising: a nonlinear optical crystal, a poled polymer fiber, and possibly a semiconductor wave guide. Preferably, regulation of the non-linearity is provided periodically, when the devices are inserted at a distance from one another, said distances being spanned by the optical fiber. However, the regulation can be non-periodic, i.e. the device(s) may of course be placed at a particular point of the link, and several (n) samples of the nonlinear crystal can be stuck together, thereby achieving the n-fold regulation (preferably, compensation) effect.

The non-linear optical crystals (for example, the presently available KTP, KDP, BBO or the like) are such capable of receiving a light beam at the fundamental harmonic and producing there-inside the second-harmonic light beam. For the sake of simplicity and in the frame of the present description, these crystals will be called Second Harmonic Generation crystals, or SHG crystals.

It is known that polymer fibers, if subjected to uniform poling, acquire the property similar to that of the above-mentioned crystals, i.e., the capability of producing the second harmonic when conducting the fundamental-harmonic light beam.

Both in the nonlinear crystals, and in the polymer fibers, the property of SGH (second harmonic generation) is capable to induce the negative sign of the effective nonlinearity produced by the device.

The semiconductor waveguides at particular conditions (when the carrier frequency of the light signal is close to the half-band of the semiconductor material) also may produce the negative nonlinearity, though this effect is based on different physical principles.

It is known to the specialists that the second harmonic generation in quadratically nonlinear media can be described by a system of two differential equations:

$$\begin{cases} i\dfrac{dU}{dz} + U*V = 0 \\ 2i\dfrac{dV}{dz} + \dfrac{1}{2}U^2 - q*V = 0 \end{cases} \quad (2)$$

Where:
U(z) is a complex amplitude of the fundamental (first) harmonic of the light signal,
V(z) is a complex amplitude of the second harmonic of the light signal produced in the crystal,
z is the propagation distance for the light signal,
q is a so-called mismatch coefficient, or phase-velocity mismatch parameter, depending on the wavelength of the optical signal
i is the square root of (−1),
* is the symbol for the complex conjugation.

It is also known that the nonlinear phase shift Δφ of the light beam at a fundamental harmonic emerging from the crystal is proportional to the following product:

$$\Delta\phi \approx K_{eff}|U|^2 \quad (3)$$

where $K_{eff}$ is the effective Kerr coefficient achieved in the crystal, and the FH field is taken at z=0 (the input field).

Further, it is known that a very large value of the effective Kerr coefficient ($K_{eff}$) can be generated via a so-called cascading mechanism in the second-harmonic-generating optical crystals [see a review article by G. I. Stegeman, D. J. Hagan, and L. Torner, Optical and Quantum Electronics., vol. 28, p. 1691–1740 (1996), and a more up-to-the-date review by C. Etrich, F. Lederer, B. A. Malomed, Thomas Peschel, U. Peschel. Optical Solitons in Media with a Quadratic nonlinearity in Progress in optics, vol. 41 ((E. Wolf, Editor; ©2000 Elsevier Science B.V.)]. Shortly, under the "cascaded second harmonic generation" one should understand performing, in an SHG element, at least one complete cycle of the energy transformation "Fundamental Harmonic—Second Harmonic-Fundamental Harmonic" (FH-SH-FH) when the input signal is launched at the Fundamental Harmonic.

Namely, it has been noticed that the value of $K_{eff}$ in the non-linear (SHG) crystals is much larger than the natural Kerr coefficient of the crystal, $$|K_{eff}| \sim +10^4 * K, \quad (4)$$

where K is the intrinsic Kerr coefficient.

The most important fact is that the gigantic Kerr coefficient $K_{eff}$ induced by the cascading mechanism may have either positive or negative sign. As it follows from the system of equations (2), it can be readily controlled by means of the phase-velocity mismatch parameter q. In turn, the latter parameter may be effectively controlled by means of the so-called quasi-phase-matching technique, which is based on a periodic poling of the optical crystal, see, for instance, a paper by O. Bang, C. B. Clausen, P. I. Christiansen, and L. Torner Engineering competing nonlinearities. Optics Letters, Oct. 15, 1999, Vol.24, No.20. So, the sign of the cascading-induced effective Kerr coefficient $K_{eff}$ may be made negative to produce the negative formal Kerr effect, which is necessary to compensate the ordinary positive Kerr effect accumulated in long fiber spans.

The above-mentioned estimate that the effective Kerr coefficient $K_{eff}$ induced by the cascading may exceed the intrinsic Kerr coefficient K by up to four orders of magnitude implies that, for a 50 km long fiber span, the necessary compensating optical path in the second-harmonic-generating crystal must be approximately 5 m. Currently, it seems unrealistic to directly implement the latter condition in an SHG medium, as the actual size of the presently available crystal samples (which have the cubic form) is limited by 5 cm (however, other samples may appear in practice in some time, if the proposed technology for the nonlinearity compensation is accepted by the industry).

Taking into account the presently available actual size of the crystals having the cubic form, a practical solution is to cover two opposite facets of the cubic sample by mirror surfaces. Using reflections of the beam from the mirrors, it is possible to arrange a multi-pass transmission of the optical beam through the crystal. According to the above estimate, the actual number of the the passes must approximately be 100, implying the separation ~0.5 mm between adjacent trajectories, which is very easy to implement.

To make this device most efficient and economical, it should be integrated with amplifiers periodically placed in the fiber communication line. Preferably, the second-harmonic-generating crystal device must be placed immediately after the amplifier, to maximize the effect provided by the device by means of using the largest input power possible.

An approximate straightforward calculation taking into account gradual attenuation of an optical signal in the free-propagation fiber span demonstrates that if the device is placed immediately after the amplifier, the necessary length of the "nonlinearity compensating" optical path can be additionally reduced by a factor of about 2.5. This result eventually implies that the incidence angle of the beam shuttling inside the mirror-covered second harmonic generating crystal, which has the size 5 cm×5 cm, should be of about 1.5 degrees, which is fairly easy to implement.

For a multi-channel transmission, such as in WDM systems, one nonlinear crystal can be used for non-linear regulation/compensation of a number of WDM channels. Many optical channels having different wavelengths can propagate in the non-linearity compensating device along different trajectories arranged in different layers of the device. Generally, the mismatch coefficient q is different for the different wavelengths (i.e., q is subject to chromatic dispersion), which, in principle, may be compensated by arranging slightly different incidence angles for the spatially separated beams carrying different channels through the SHG crystal, see above. In any case, if it is known in advance which channels will suffer from incomplete compensation of the nonlinearity, they can be used for transmitting less responsible information.

It has been noticed by the Inventors that the proposed device, being effective in regulating/compensating the nonlinearity, successfully provides the pulse shaping as well. In other words, the pulse shaping of an optical phase signal can be achieved by passing it through the above-mentioned SHG device, which may be a small optical crystal or, in principle, also a poled piece of a polymer fiber. It is assumed that the carrier frequency of the optical signal coincides with the frequency of the fundamental harmonic (FH) involved into the parametric energy conversion inside the SHG module. Parameters of the module (first of all, the optical path of the beam propagation inside the module) can be easily selected so that the peak power of the given input signal exactly or approximately corresponds to the complete conversion cascade: FH→SH→FH, so that the portion of the signal around its center will be passed by the module with a very little share of the power lost to the generation of a residual portion of the second harmonic (SH). However, for portions of the same signal corresponding to smaller local values of the power, the actual propagation length in the module will be quite different from that corresponding to the complete cascade, hence, a considerable part of the energy will be lost by those portions (as the SH wave cannot propagate in the optical communication fiber). This simple mechanism can effectively chop off wings of a smooth pulse, making its shape essentially closer to the rectangular one.

Of course, the proposed shaping mechanism gives rise to extra energy losses, which should be compensated by an increase of the gain provided by the optical amplifiers installed into the link. Due to this, the preferred arrangement of the link is that with the pulse-treatment device placed immediately after the amplifier, which will make it possible to reduce the propagation length of the signal inside the device, necessary for the completion of the nonlinear (power-dependent) conversion cascade.

However, estimates show that, even in such a configuration, the FH propagation length necessary for pulse shaping at a particular input power amplitude, which can be achieved with available SHG crystals, is much larger than the possible largest size of the crystal. Again the same solution as that proposed above for the nonlinearity compensation may resolve the problem: one may pass the signal through the crystal many times. In other words, both for the nonlinearity compensation and for the pulse shaping, the Inventors propose the configuration with the SHG element (actually, the crystal) covered by reflecting mirrors on its front and back facets, leaving two narrow windows, to be used as the entrance for an input signal and the exit for an output one.

Actually, the device described above is a unit that can be easily inserted at a suitable point into an optical link. For example, it can be integrated into a network node, which usually comprises amplifiers and devices for compensating other undesired effects (for instance, optical filters).

The drawings that are referred to below illustrate the most preferred embodiment of the invention according to which the pulse-treatment device is based on the SHG optical crystal.

An Inventors' theoretical article "Shaping NRZ pulses by a second harmonic generating module" (being submitted for publication simultaneously with filing the application), which describes further technical details, is incorporated herein by reference.

Further, the Inventors propose using the signal treatment device comprising an SHG element for monitoring an incoming signal applied to the device at the fundamental harmonic (FH), by means of monitoring and further processing an outgoing signal at the second harmonic (SH). By selecting an internal optical path in the signal treatment device, a suitable SH signal can be obtained which enables monitoring thereof and judging on the incoming signal, including determining a number of its parameters. If performed by one and the same device, the monitoring can be best combined with the nonlinearity treatment/compensation.

Figure 1B:
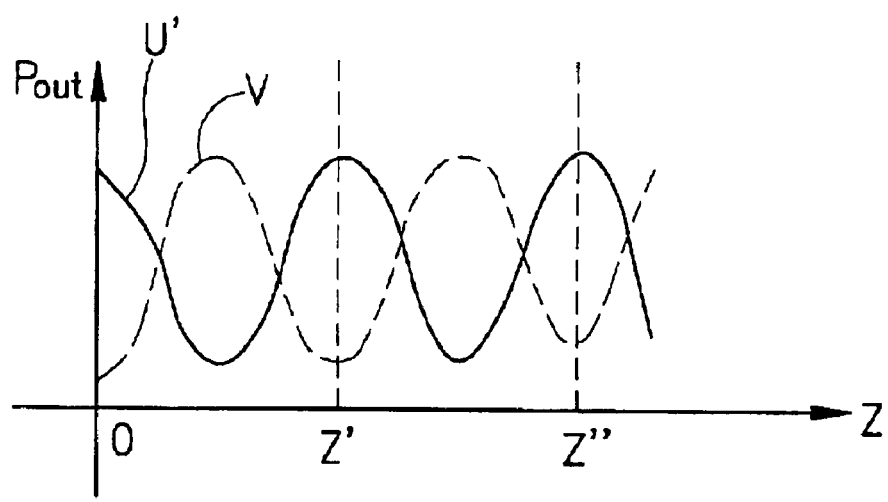
FIG. 1b (prior art) schematically shows behavior of output powers of the fundamental harmonic and the second harmonic signals versus the propagation length in the SHG element.

In FIG. 1a, the optical non-linear crystal is marked 10, the incoming optical signal carried by the fundamental harmonic U(FH) is marked 12, the optical axis "z" of the crystal is marked 14. The crystal produces an output fundamental harmonic U' signal (16) and also an output second harmonic signal V (18). The behavior of the output power in the fundamental harmonic (FH) U' and second harmonic (SH) V vs. the propagation length of the signal in the crystal is shown in FIG. 1b.

Figure 5:
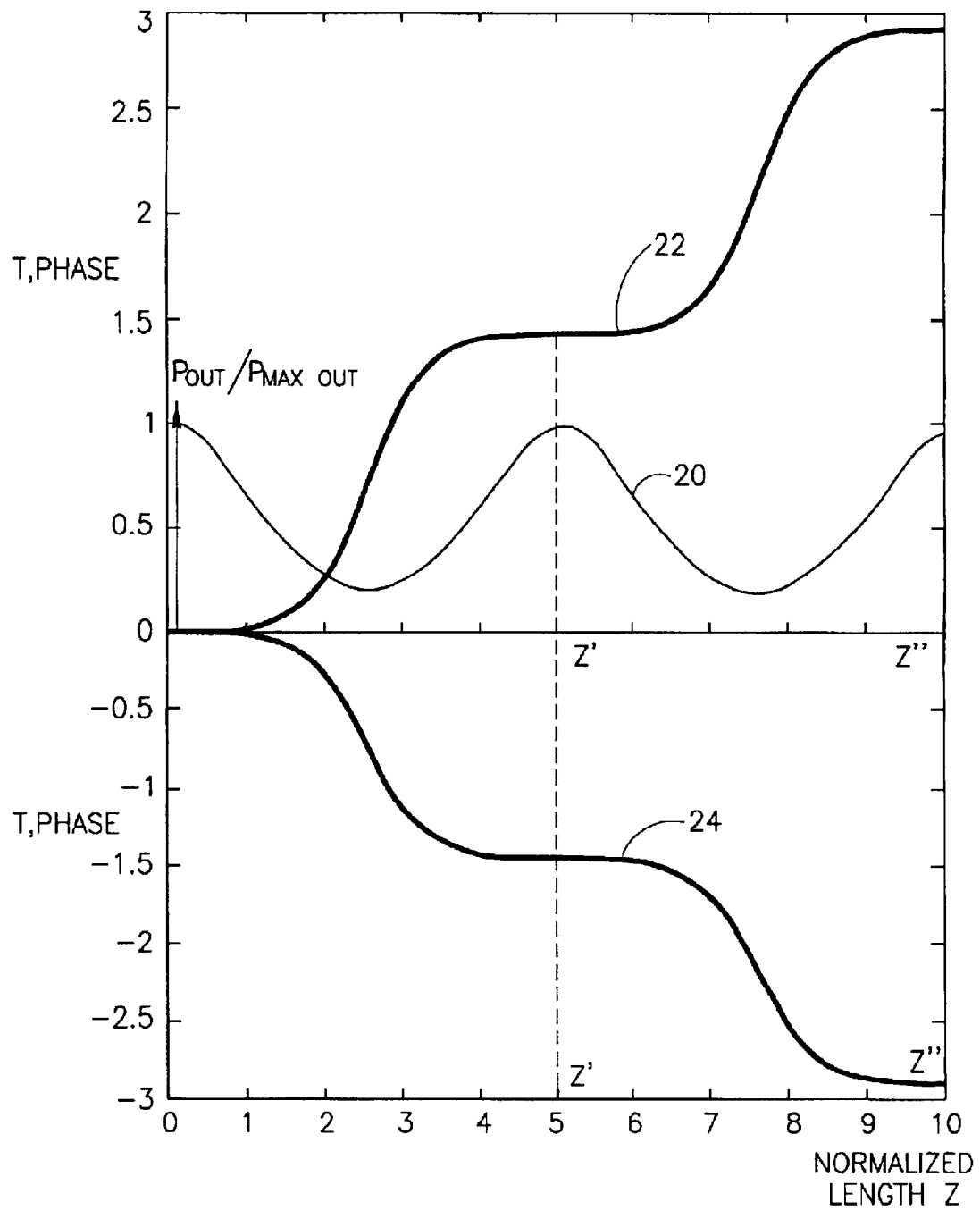
FIG. 5 schematically shows mathematically obtained graphs of nonlinearity induced by the SHG element, in cases of the positive and the negative Kerr coefficients, respectively.

For the effects of pulse shaping and nonlinearity treatment, the invention puts an emphasis on obtaining from the crystal the FH signal U', which is always characterized by a particular sign of the cascading-induced effective Kerr coefficient. The character of the nonlinearity induced by the crystal in case of the positive or the negative effective Kerr coefficient is schematically shown in FIG. 5.

Figure 6A:
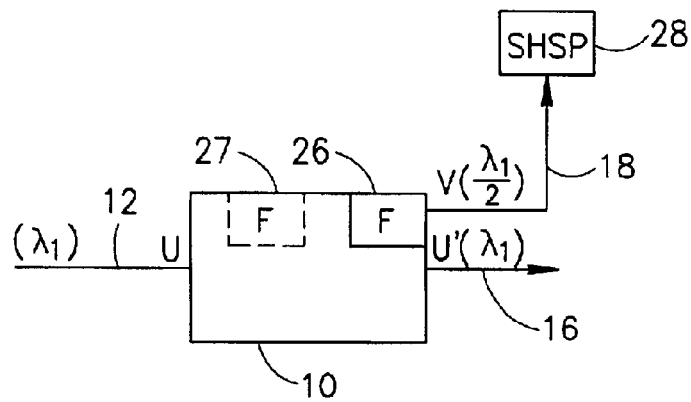
FIGS. 6a and 6b schematically illustrate the proposed principle of monitoring an incoming optical signal using a second harmonic generated by an SHG element.

The above effects are based upon the output FH signal U', while the effect of monitoring utilizes the output SH signal (see FIGS. 6a,b,c). To obtain the output FH signal upon the complete cascading process, the length "z" of the required optical path in the crystal (along the axis z) can be predicted using the system of equations (2). It is known and schematically shown in FIG. 1b that the FH output periodically increases and decreases, depending on the length of the optical path in the crystal (see points Z' and Z" of maxima of the FH output). Therefore, for obtaining the effects of pulse shaping and the nonlinearity treatment, the crystal should provide for such a length of the optical path which ensures the maximum power output at FH. Additional conditions will be explained with the reference to FIGS. 2a, and 2b.

For designing the device suitable for the nonlinearity compensation, the sign of the Kerr effect created in the crystal should be negative. For designing the device mainly intended for pulse shaping or monitoring, the sign of the induced Kerr effect is unimportant, though should be taken into account in the network calculation. It is to be emphasized that the single nonlinear crystal with the negative sign of the Kerr effect can be designed and utilized for any of the proposed purposes.

FIGS. 2a and 2b illustrate how the pulse shaping mechanism depends on the optical path (propagation length) of the fundamental harmonic in the SHG element.

It has been found and shown by the Inventors that if an optical pulse signal 15 having a Gaussian shape with the amplitude Pmax is applied to an SHG device 10 as its Fundamental Harmonic, there can be found a shortest optical path Z' in the device, corresponding to the first maximum of the FH output power signal, upon passing which the pulse leaves the SHG device without loss of its peak power, while the slopes of the pulse are transmitted with losses. The obtained re-shaped pulse, being closer to a rectangular pulse, is marked 17 in FIG. 2a.

When the optical path essentially deviates from the shortest path Z' and approaches a path Z" corresponding to the second maximum of the FH output power signal, the shape of the obtained pulse will become distorted and may finally acquire the form close to 19 schematically shown in FIG. 2b by a solid line. If the optical path is further increased and attains the third maximum, the output pulse shape might assume an oak-leaf shape (shown by the wavy line).

Therefore, for obtaining the pulse-shaping effect from the proposed signal handling device, the use of the shortest optical path is preferred. Other maxima of the FH output energy (second, third, etc.) and optical paths associated therewith can be used for the nonlinearity compensation but seem impractical for the pulse shaping requirement due to severe distortion of the outgoing pulse.

Figure 3:
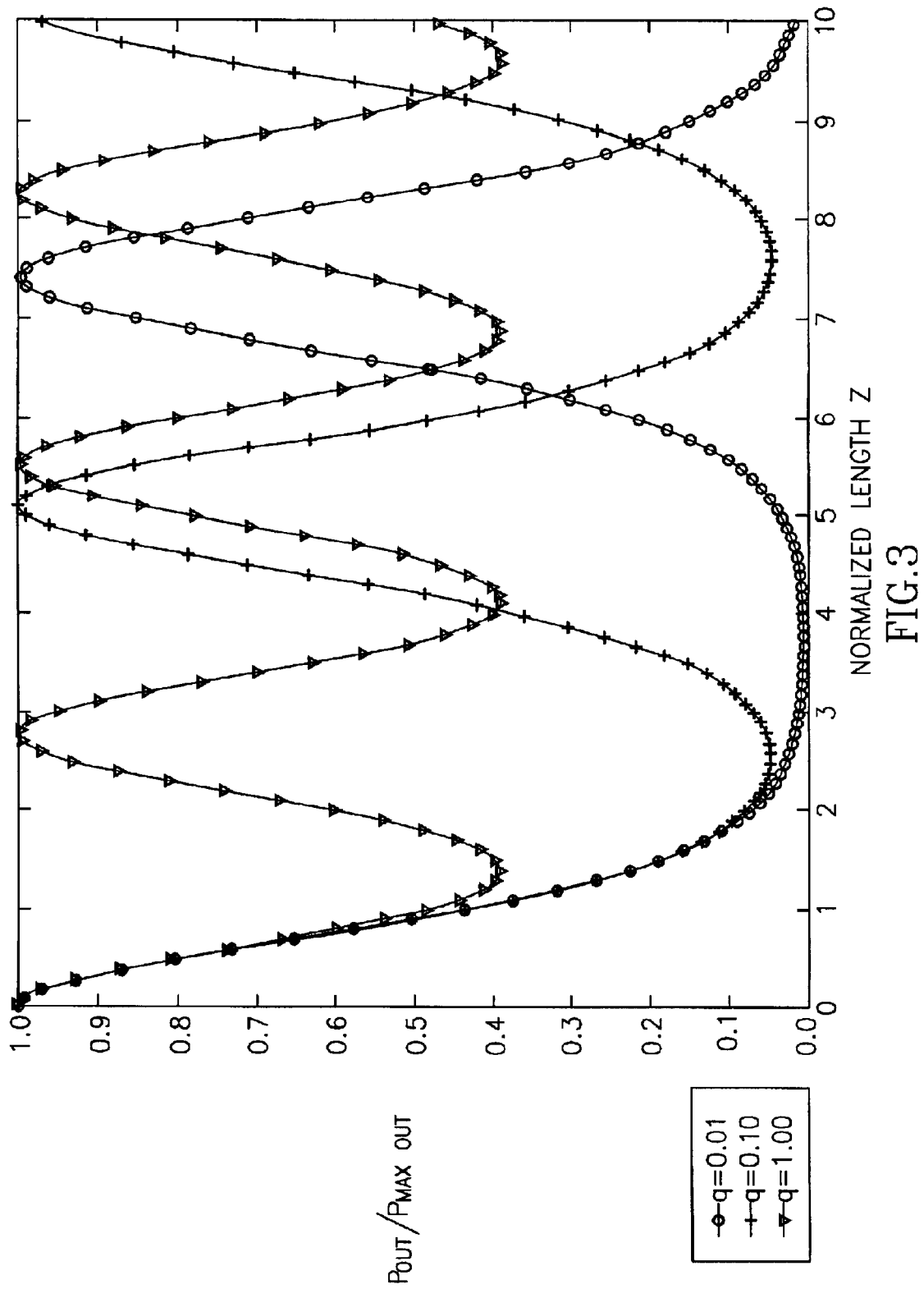
FIG. 3 shows several graphs obtained by mathematical simulation and demonstrating dependence of the shortest optical path in the SHG crystal on its mismatch coefficient q.
Figure 4:
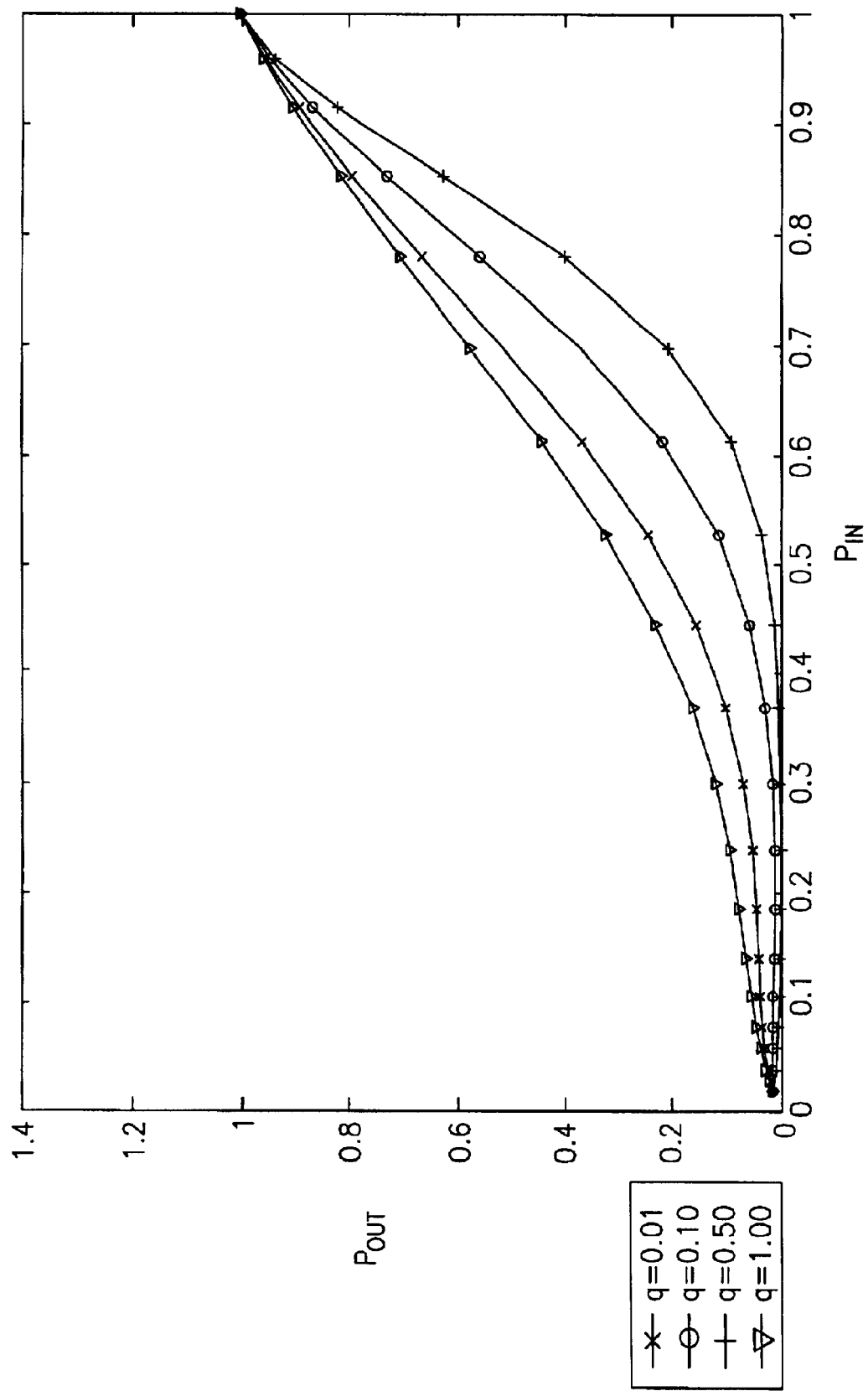
FIG. 4 illustrates graphs obtained by mathematical simulation and characterizing the pulse shaping ability of SHG elements with different values of q.

FIGS. 3, 4 and 5 illustrate mathematically obtained graphs characterizing various SHG elements, which graphs can be used for the design of the signal handling device according to the invention. In this particular example, we will describe designing the device suitable for pulse shaping and nonlinearity treatment.

To practically determine "the shortest optical path" or the shortest propagation length in a particular pulse-treatment device preferred for the pulse shaping, the following steps can be performed.

Since each particular SHG element is characterized by its two intrinsic parameters—the nonlinearity coefficient $\gamma$ and the mismatch q (which in principle, depend on the carrier wavelength), a graph of the FH-SH-FH cascaded generation can be drawn for the particular element and the specific FH wavelength (FIG. 3 shows a number of curves for various values of the mismatch coefficient q). Each particular graph is drawn for a particular value of the normalized dimensionless pulse power and a normalized, also dimensionless propagation distance and actually shows how the degree of transmission of the FH through the element depends on the propagation length.

The following equation proposed by the Inventors defines the normalized propagation length in the device in terms of the real propagation length and constitutes a so-called condition of optimum pulse reshaping:

$$Z'=(\gamma\sqrt{Pmax})Zreal \qquad (5)$$

where

Z' is the normalized length of the optical path in the particular SHG element, at the point of first maximum of the transmitted FH power;

$\gamma$ is a nonlinearity coefficient known for the particular SHG element;

Pmax is the peak power of the pulse applied to the SHG element at FH;

Zreal is the real optical path which the incoming optical beam should pass in the SHG element to satisfy the condition of the full transmission of the pulse's peak power.

The point showing at which optical path Z' the first maximum of FH occurs can be found using the above graph drawn for the particular SHG element.

The obtained dimensionless value of Z' is used to solve the equation numerically, and we obtain:

In other words, knowing Z' and $\gamma$ for a selected SHG element and using the above equation, one may select a suitable proportion between the power of the amplitude of a real optical pulse applied to the SHG element and the real optical path which is to be passed by this real pulse in the element. The suitable proportion allows obtaining an outgoing pulse providing for the pulse shaping and/or regulation of nonlinearity.

Such a device may be designed either for handling preferably a single effect (say, pulse shaping), or for the pulse shaping simultaneously with the nonlinearity treatment.

It has further been shown by the Inventors that efficiency of the pulse shaping depends on the value of mismatch q of the SHG crystal, namely the smaller the mismatch q, the sharper the pulse shaping effect (FIG. 4). In light of the above, for designing the pulse treatment device preferably intended for pulse shaping, SHG elements with small values of q are to be selected.

To practically estimate the degree of positive or negative non-linear phase shift which is introduced by a particular SHG device, an additional graph can be drawn, to be considered together with the above-mentioned transmission graph. Actually, for the same values γ and q of the particular SHG element, and the same FH wavelength, we plot the phase-shift vs. the normalized propagation length (FIG. 5). The point on the phase-shift plots 22 or 24 corresponding to the first maximum (at Z') of the transmission graph 20 will indicate the degree of nonlinearity which may be introduced by the particular signal handling device to a fiber-optic link. Keeping in mind that the sign of the nonlinearity is either positive or negative as shown in FIG. 5 (the graphs 22 and 24 pertain to the positive and negative resulting Kerr effect, repsecitvely), the device may serve for regulation the total nonlinearity in the optical link.

Based on the above, and according to yet another aspect of the invention, there is provided a method for designing a signal handling device for treating at least one effect from a list comprising nonlinearity and pulse distortion of an optical pulse if applied to the device at a particular wavelength, the method comprising:

selecting a Second Harmonic Generating (SHG) element for the device, sensitive to a fundamental harmonic (FH) defined by the particular wavelength and characterized by its physical parameters;

selecting, by a suitable calculation, at least one ratio between amplitude of the pulse to be applied to the pulse treatment device at said wavelength and an optical path to be passed in the device to ensure the maximum peak power of an outgoing pulse at the FH, choosing input and output ports defining the selected optical path.

The last step preferably comprises designing the element with mirror surfaces so as to form between the input and output ports the necessary multi-segment trajectory resulting from one or more internal reflections from the mirror.

The need to have an extended (multi-segment) optical path is dictated by the fact that the optical path, ensuring the maximum peak power of the FH pulse outgoing the device, usually appears to excess practically available dimensions of the SHG element to be used in the device.

When designing/producing the device for the nonlinearity compensation of the optical signal of a particular wavelength of interest, the method must ensure that the sign of the effective Kerr nonlinearity created by the obtained element for the particular wavelength of interest is negative.

When manufacturing the device, the effective Kerr coefficient to be induced in the crystal can be controlled by periodic poling of the said SHG optical crystal.

The device may be designed with a number of optional input/output ports and optical collimators, which enable adjusting the device, at the site, to changing conditions and requirements, for example to the monitoring feature.

FIG. 6a schematically illustrates how the signals handling device 10 comprising an SHG element can be used for monitoring the incoming fundamental harmonic signal U (12) at the wavelength λ1 by monitoring the outgoing second harmonic signal V (18) having the wavelength ½ λ1 and processing results of the monitoring. A monitoring filter 26 is responsible for outputting a particular portion (say, 5% or more) of the SHG signal from the nonlinear element; a second harmonic signal processor (SHSP) 28 provides required operations to refer the obtained signal to behavior of the optical signal on the fundamental harmonic (FH) and determine such parameters of the FH signal as its bit rate, BER (bit error rate), power of the FH signal, spectrum of the FH, etc. The processor 28 can be operative to produce various informational messages and/or control commands based on results of the monitoring. Position of the monitoring filter with respect to the SHG element may not coincide with position of the FH output, i.e., the internal optical path selected for the monitoring may differ from that selected for transmitting the main, fundamental harmonic signal through the SHG element. Such an optional position of the monitoring filter is marked with a schematic box 27.

Figure 6B:
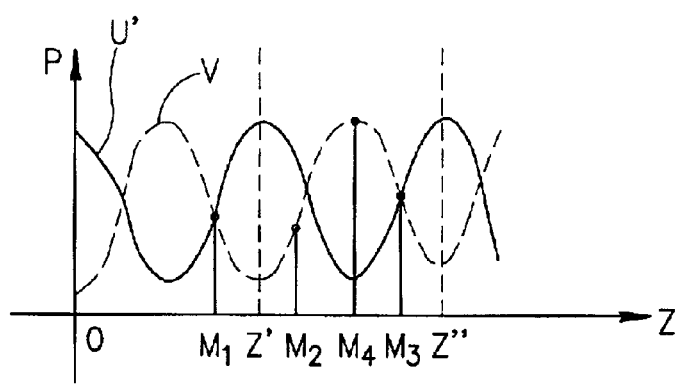

FIG. 6b illustrates how the phase of output power of the outgoing SH signal 18 should be selected to obtain a non-zero power of the second harmonic output suitable for monitoring thereof. As has been explained above, phase of the power signal of the SH outgoing signals depends on the length of internal optical path of the incoming beam in the device. Therefore, to allow the monitoring operation on the SH, though to ensure transmitting the initial pulse signal through the device and outputting thereof on the FH, the internal optical path is preferably selected so as not to produce an output power peak of the fundamental harmonic (FH), for example somewhere corresponding to points m1, m2, m3 shown in the drawing. Generally speaking, the second harmonic (SH) signal may be extracted from the device at an output port different from the port where the fundamental harmonic signal is obtained. In any case it should be taken into account that the power extracted from the SHG element with the SH signal will result in reducing the power amplitude of the obtainable FH signal. Therefore, a SH signal may be probed for monitoring at an output port on the element corresponding to point m4 in the drawing, but with the aid of the monitoring filter which allows only a partial extraction thereof.

In the frame of a single device, the monitoring function can be performed either alone, or be preferably combined with the nonlinearity treatment function. The pulse shaping function, if also required, can be better obtained by designing a separate signal handling device though other combinations are possible.

Figure 7:
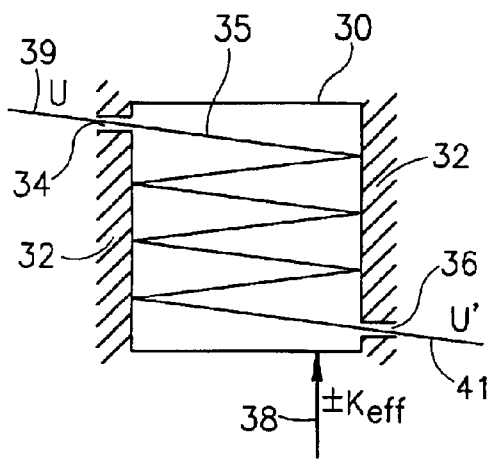
FIG. 7 schematically illustrates one embodiment of the signal handling device according to the invention.

FIG. 7 schematically shows a cross-section of one embodiment 30 of the signal handling device, comprising an optical crystal adapted for forming a multi-pass (multi-segment) trajectory of the optical beam and suitable for regulating nonlinearity, pulse shaping and/or monitoring of optical signals. The optical crystal 30 is, say, a KTP or BBO nonlinear crystal of the cubic form, which is coated by internal reflecting surfaces 32 at two of its opposite facets. As known in the art per se, there are various ways of creating such reflecting surfaces. In FIG. 7 the crystal is provided with one input opening 34 in the reflecting surface, via which the incoming optical pulse signal, which corresponds to the fundamental carrier harmonic U in terms of the notation adopted in the mathematical model introduced above, enters the crystal. The crystal is preliminarily controlled (schematically shown as arrow 38) to adjust the sign and value of the effective Kerr coefficient produced by it. Suppose, the negative Kerr coefficient has been ensured. In the crystal, owing to the reflecting surfaces, the light beam is forced to follow the multi-pass trajectory 35 for extending the optical path and comes out via an output window 36 as a modified signal U'. In the signal U', the earlier accumulated positive Kerr effect is compensated with the negative Kerr effect created by the crystal. As has been explained before, the trajectory can be made sufficiently long to provide for the value of the effective Kerr coefficient required for compensating the accumulated positive Kerr effect. The accumulated compensating phase shift is almost directly proportional to the length of the total optical path via the crystal. To obtain the phase shaping effect in addition to the non-linearity compensation, this length should approximately correspond to the first propagation maximum of the fundamental harmonic. The total trajectory length, in turn, can be regulated by the incidence angle of the beam 39.

For calculation of the extended optical path required for the nonlinearity compensation, the system of equations (2) can be used and boundary conditions of reflection should be considered for taking into regard the phase shift appearing at the points of the beam reflection from the mirror surfaces. Additionally, for performing both the pulse shaping and the nonlinearity, the relation between the minimal propagation length and the power of the FH input amplitude should be taken into account.

It should be noted that for providing the monitoring function, the selected trajectory length should not correspond to a maximum of the fundamental harmonic (i.e., a minimum of the second harmonic).

The crystal 30 can be placed in a container, and the windows 34 and 36 can be provided with collimating lenses for focussing and adjusting the light beam.

Figure 8:
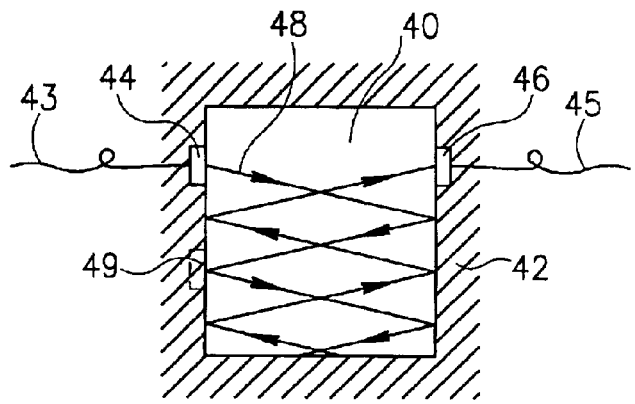
FIG. 8 schematically illustrates another embodiment of the device.

FIG. 8 shows another modification 40 of the proposed device, where the non-linear optical crystal (shown in its cross section) is completely coated by a reflecting surface 42. Openings 44 and 46 in the mirror surface are equipped with adjustable collimating lenses (schematically shown as boxes) being connected to optic fibers 43 and 45. Owing to the additional reflecting surface at the bottom facet of the crystal, the optical path of the beam 48 in the crystal can be twice as long in comparison with that shown in FIG. 7 (if the crystals are similar). Moreover, one or more optional windows 49 can be provided on the surfaces of the crystal. The trajectory length can be thus regulated by selecting a particular incidence angle and a particular pair of the windows between which the beam should be passed. In principle, such a device may also serve as a variable signal handling module. It can be adjusted for changing conditions and requirements, and thus serve for any of the three described options—pulse shaping, nonlinearity treatment and signal monitoring.

FIGS. 7 and 8 may successfully illustrate a signal handling device for the multi-channel optical transmission, too. In such a case (for example, in a WDM transmission system) the incoming light beam arriving from an optical fiber comprises a number of fundamental harmonics with respective wavelengths $\lambda 1, \lambda 2, \ldots \lambda n$ (n optical channels). Having the same incident angle, the fundamental harmonics propagate in the crystal along almost a common trajectory. It should be taken into account that value of the Kerr effect produced in the crystal depends on the wavelength, so results of the required signal handling operations provided by the crystal might be different for different optical channels.

Figure 9A:
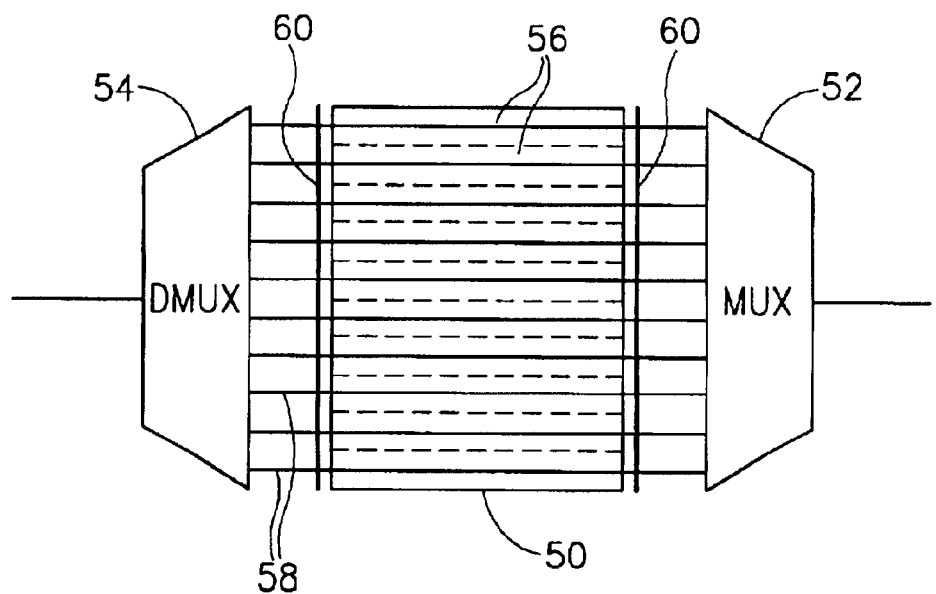
FIGS. 9a, 9b illustrate yet another embodiment of the signal handling device suitable for use in multi-channel transmission systems.
Figure 9B:
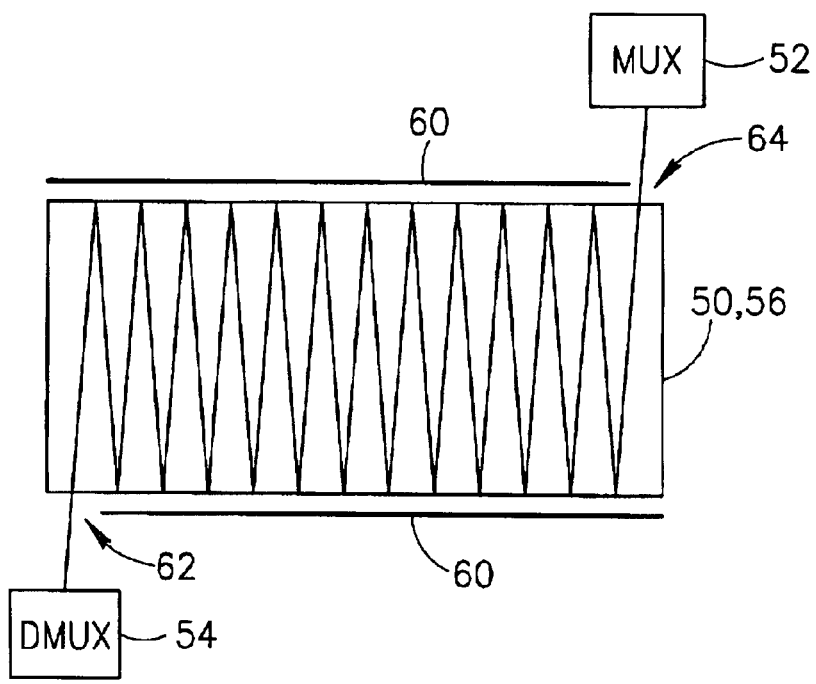

FIGS. 9a and 9b, showing two mutually perpendicular cross-sections, illustrate another embodiment 50 of the signal handling device, specifically designed for the use in multi-channel transmission systems, such as WDM ones. The multiplexing and de-multiplexing units associated with it are marked 52 and 54. The embodiment 50 comprises an SHG crystal geometrically divided into a number of layers 56 (preferably parallel), wherein each layer serves as a separate SHG element intended for the nonlinearity regulation, pulse shaping and/or monitoring in a particular optical channel. The layers 56 of the crystal 50 and the channels 58 of the multi-channel format are in one-to one correspondence.

In this embodiment, the crystal is provided with mirrors 60 positioned at two opposite facets thereof, to enable internal reflections of each incoming optical beam. The mirrors 60 are provided with a pair of windows 62, 64 at each of the layers, for serving the incoming optical beam and the outgoing optical beam of each particular optical channel. Since each optical beam propagates in its own spatial slot, it does not affect processes taking place in adjacent layers. An estimate shows that the thickness of each layer does not have to be larger than 1 mm.

However, each of the optical channels may comprise parasitic wavelengths differing from the fundamental harmonic. Also, such irrelevant wavelengths may enter the layers at the stage of passing the demultiplexed channels to the SHG crystal 50. To overcome that, the embodiment shown in FIGS. 9a, 9b may comprise SHG layers 56 separated from one another by any insulating interface (not shown), for example by interface based on gratings.

Each layer may perform one or more of the signal handling functions, depending on the internal optical path length selected for the optical beam of the particular channel and additional equipment (amplifiers, monitors, collimators, etc)

Figure 10:
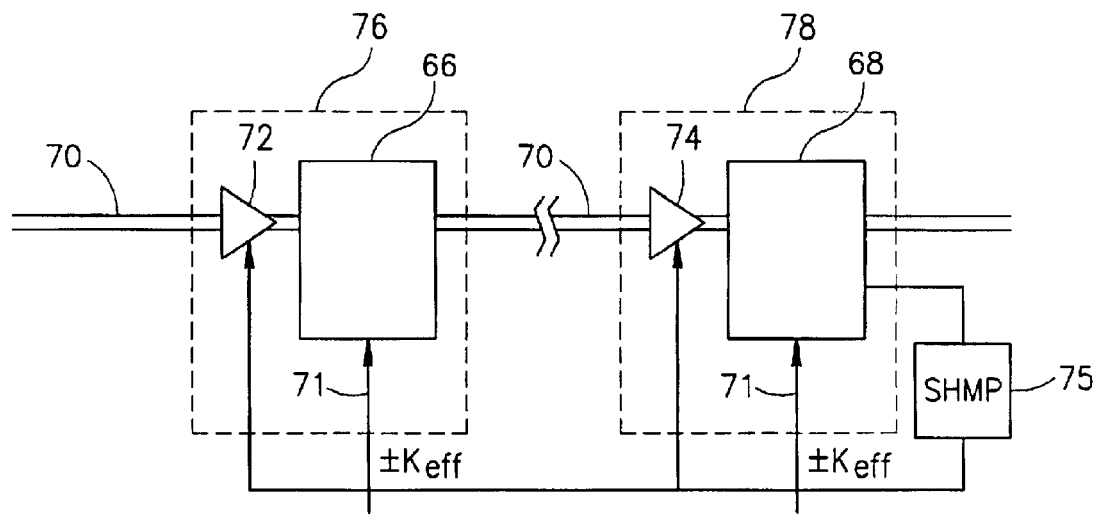
FIG. 10 is a schematic exemplary illustration of the proposed method and system for handling optical signals by compensation of non-linearity, monitoring and/or pulse shaping in optical fiber communication links.

FIG. 10 schematically illustrates a system where more than one inventive devices (66 and 68 are shown) are periodically inserted into a fiber-optic link 70 to compensate the ordinary positive Kerr effect accumulated in long fiber spans, to shape the distorted pulses and to monitor the signal. Non-linear optical crystals are suitable for the purpose. Knowing that the cascading-induced effective Kerr coefficient ($K_{eff}$) in a relatively small SHG crystal may be very high, and knowing how to adjust the sign of the effective Kerr coefficient in the crystal, the problem can be solved. The procedure of checking the sign of the Kerr effect of the crystal is performed in advance, when manufacturing it. If the sign of the effective Kerr coefficient does not suit the purpose it will be altered by means of periodical poling (the quasi-phase-matching technique). Eventually, the value of the effective Kerr coefficient can also be adjusted, using this procedure. After ensuring that the effective Kerr coefficient is negative (arrow 21 signifies the operation provided in advance), its value may be further adjusted to the given length of the fiber-optic span, the nonlinearity accumulated in which is to be compensated. The most preferred option is adjustment of the effective optical path of the light beam inside the devices 66 and 68 by arranging the multi-pass internal transmission as is shown in FIGS. 7 or 8. An additional option is to insert more signal handling devices into the link 70.

Suppose, the nonlinear optical crystal 66 also performs the pulse shaping. Its internal optical path is adjusted up to the minimum optical path at which the FH power output reaches its first maximum. Knowing the peak power required for effective operation of the communication link, the corresponding minimum optical path in the crystal is to be matched accordingly and maintained.

Optical signal amplifiers 72 and 74, inter alia, are intended for adjustment of the peak power of the FH pulses incoming the device 66 and 68, respectively.

Suppose the device 68, in addition to the nonlinearity compensation, also performs monitoring of the second harmonic signal using a block 75 shown schematically and generally called a second harmonic monitoring processor (SHMP). For example, the block 75 may analyze the amplitude of the SH signal outputted from the crystal 68 and based on that adjust the gain of the amplifier 74. Alternatively or in addition, the block 75 can be made operative to analyze whether rectangularity of the pulses arriving to the device 68 is sufficient and to affect the amplifier 72 of the nonlinear element 66 for adjusting its pulse-shaping function. An additional output 77 of the block 75 is intended for forwarding the monitoring results to a management unit (not shown) for the analysis, management, control and maintenance purposes (for example, the bit rate can be changed based on the BER measurement).

The nonlinear crystals 66 and 68 may physically form a part of network nodes marked 76 and 78. Preferably, the crystals are placed immediately after the optical amplifiers 72, 74 of the nodes.

Figure 11:
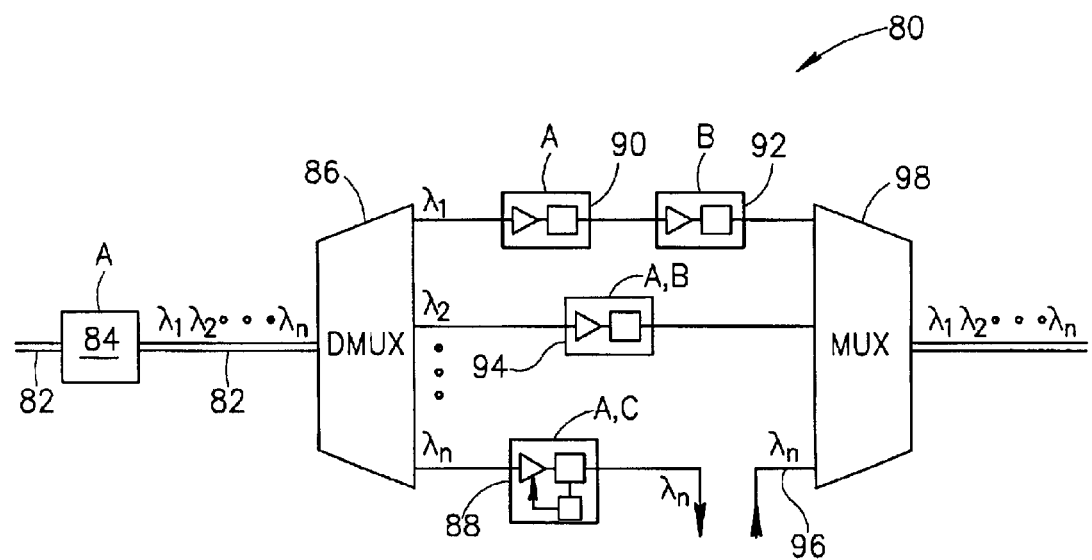
FIG. 11 schematically illustrates another embodiment of the system according to the invention, for a multi-channel transmission format.

FIG. 11 illustrates an exemplary embodiment of a multi-channel optical transmission system 80 utilizing the proposed signal handling devices of different types (i.e., designed to preferably perform one or more of the mentioned functions). In this case the system is a kind of OADM comprising multiplexing and de-multiplexing components for handling multiple channels in the WDM transmission format. Let the pulse treatment devices designed for nonlinearity compensation be marked "A", those designed for pulse shaping be marked "B", and those allowing the monitoring on the second harmonic signal be marked "C". A number of optical channels with different wavelengths λ1, λ2, . . . λn is transmitted over a transmission link 82. A signal handling device 84 of the type "A" can be inserted in the link 82 to preliminarily compensate nonlinearity accumulated in all the optical channels due properties of the optical fiber of the link. The optical signals are de-multiplexed by DMUX unit 86. One of the channels (λn) is dropped and then added, but before dropping to a customer, the nonlinearity accumulated in the optical signal is finely compensated by device 88. The device is of a combined "A" and "C" type which enables monitoring of the signal. In a case when the data signals in this channel follow at a relatively low bit-rate, no serious signal shaping is required. Other channels are treated both against the nonlinearity accumulation, and against the pulse distortion. For example, the optical signal passing via the λ1 channel is conveyed via an "A"-type device 90 and then, additionally, via a "B" type device 92. The optical signal of the λ2 signal is treated by a combined "A,B" type device 94 which provides reasonable treatment to these two effects. The restored signals of different channels, with the newly added and not yet distorted signal 96 at the wavelength λn are multiplexed by the MUX unit 98 for transmitting via the subsequent optical link 100.

Optical signals of other channels may be treated in an analogous manner or using the multi-layer embodiment 50 of the signal handling device shown in FIGS. 9a, 9b.

It should be emphasized that the above description of specific implementations of the invention is not limiting, and other embodiments of the invention may be proposed within the scope of the concept, and are to be considered a part of the invention.

What is claimed is:

1. A method for handling an optical pulse signal in a communication fiber link by ensuring at least one operation from the following: pulse shaping, treatment of nonlinearity and monitoring, the method comprising:

providing a signal handling device comprising one or more SHG elements, each being capable of performing a cascaded second harmonic generation (SHG) with respect to a particular fundamental harmonic (FH), selecting at least one of said operations, selecting an inner optical path length in said one or more SHG elements to perform said at least one selected operation with respect to an incoming optical pulse signal carried by a wavelength defined by said particular fundamental harmonic (FH), conveying the incoming optical pulse signal carried by said wavelength along the selected optical path in said signal handling device, according to the selected at least one operation, obtaining from said signal handling device at least one output optical pulse signal from a list comprising:

an output optical pulse signal at the fundamental harmonic (FH), wherein the treatment of nonlinearity and/or the pulse shaping are performed, an output optical pulse signal at the second harmonic (SH) for further monitoring it and judging about said input optical pulse signal.

2. The method according to claim 1, enabling the operation of nonlinearity treatment, wherein such said inner optical path length is selected via the one or more SHG elements for conveying the incoming optical pulse signal with a known amplitude that is substantially close to the length upon passing which the output optical pulse signal at the fundamental harmonic (FH) reaches the maximum peak power.

3. The method according to claim 1, ensuring the operation of pulse shaping, wherein such said inner optical path length is selected for conveying the incoming optical pulse signal with a known amplitude via the one or more SHG elements that is substantially close to the shortest optical path length upon passing which the output optical pulse signal at the fundamental harmonic (FH) reaches the maximum peak power.

4. The method according to claim 1, allowing for the monitoring operation, comprising selecting said inner optical path length for conveying the incoming optical pulse signal via the one or more SHG elements that enables obtaining from said device the output optical pulse signal at the second harmonic (SH) with a non-zero peak power.

5. The method according to claim 1, wherein the conveying is performed by passing the signal along a multi-segment trajectory in said at least one SHG element, thereby arranging an extended optical path.

6. The method according to claim 5, wherein the conveying is performed via a multi-segment "zig-zag" trajectory by arranging one or more internal reflections in the at least one SHG element.

7. The method according to claim 2, for nolinearity compensation, further comprising a preliminary step of ensuring that the sign of the Kerr effect created by said device to said wavelength is negative.

8. The method according to claim 1, for gradual handling of the optical signal in a fiber optic link, comprising conveying of the incoming optical signal via a chain including more than one SHG elements, and wherein the SHG elements in the chain are spanned by sections of the fiber optic link.

9. The method according to claim 1, for handling optical pulse signals in a multi-channel transmission of optical data where each of the optical channels transmits a specific optical signal at a particular optical wavelength, comprising performing steps of claim 1 with respect to each particular optical channel.

10. The method according to claim 9, comprising conveying the optical pulse signals of different said optical channels via respective different said signal handling devices.

11. The method according to claim 9, comprising conveying the optical pulse signals of different said optical channels via one and the same common signal handling device.

12. The method according to claim 9, comprising selecting optical channels with better results of the signal handling for transmitting information having higher priority.

13. A device for handling an optical pulse signal from the point of at least one of the following operations: pulse shaping, treatment of nonlinearity and signal monitoring, in a fiber communication link, the device comprising one or more second harmonic generating (SHG) elements, each of the one or more SHG elements being capable of performing a cascaded second harmonic generation (SHG) with respect to a particular fundamental harmonic (FH), the device being adjustable for selecting the inner optical path via said one or more SHG elements for an incoming optical pulse signal carried by a wavelength defined by said particular fundamental harmonic (FH), so that upon conveying said incoming optical pulse signal along the selected optical path, the device enables obtaining at least one output optical pulse signal from a list comprising:

an output optical pulse signal at the fundamental harmonic (FH), wherein the treatment of nonlinearity and/or the pulse shaping are performed, an output optical pulse signal at the second harmonic (SH) suitable for further monitoring and judging about said input optical pulse signal.

14. The device according to claim 13, having the optical path length close to the shortest one upon passing which the outgoing FH optical pulse signal reaches the maximum peak power, thereby suitable for pulse shaping.

15. The device according to claim 13, wherein said at least one second-harmonic-generating (SHG) element is selected from a non-exhaustive list including: a second harmonic generating (SHG) optical crystal and a second harmonic generating (SHG) polymer fiber.

16. The device according to claim 15, wherein said SHG element constitutes an SHG optical crystal selected from a non-exhaustive list comprising KTP, KDP and BBO.

17. A device for handling an optical pulse signal in a fiber communication link, the device comprising one or more second harmonic generating (SHG) elements and is adapted to provide a selectively adjustable inner optical path for said optical pulse signal via said one or more SHG elements, in the device, said at least one SHG element being covered by mirror surfaces at least at its two opposite facets and leaving at least two windows at said opposite facets for an incoming optical beam and an outgoing optical beam respectively, the arrangement being such to create one or more internal reflections of the optical beam if passing between said two windows, thereby providing an extended internal optical path.

18. The device according to claim 17, wherein said extended internal optical path has the length suitable for obtaining the output optical pulse signal on the fundamental harmonic (FH) with a peak power close to maximum and/or the output optical pulse signal on the second harmonic (SH) with a non-zero peak power.

19. The device according to claim 18 suitable for pulse shaping, having substantially the shortest length of the extended internal optical path, upon passing which the output FH optical pulse signal reaches the maximum peak power.

20. The device according to claim 17, wherein the said at least one SHG element has a cubic form.

21. The device according to claim 17, wherein said at least one SHG element is provided with more than two said windows, thereby enabling selection and activation of any pair of such windows for selecting and/or adjusting length of said internal optical path.

22. The device according to claim 17, further provided with collimators associated with said windows and serving for adjusting the incident angle of the light beam.

23. The device according to claim 17, adapted for signal handling in a multi-channel transmission format wherein multiple channels transmit optical signals at respective wavelengths differing from each other, said device being capable of Second Harmonic Generation (SHG) with respect to the wavelengths of more than one channels of said format.

24. The device according to claim 23, wherein the pulse treatment device, being capable of SHG with respect to the wavelengths of a number of the multiple optical channels, is divided into the number of layers for respectively conveying there-through optical signals of said number of the multiple optical channels.

25. The device according to claim 24, wherein the layers are separated from one another geometrically.

26. The device according to claim 25, wherein the layers are separated from one another by wavelength filtering means.

27. The device according to claim 17, integrated with an optical amplifier and placed immediately after said amplifier.

28. A system for handling optical signals passing via optical fiber links from the point of pulse shaping, nonlinearity treatment and/or monitoring, the system comprising two or more devices according to claim 13, inserted in one or more optical fiber links and operative to perform pulse shaping, nonlinearity treatment and/or monitoring with respect to at least one optical pulse signal.

29. A method for designing a device for handling optical signals in a communication fiber link from the point of at least one operation from a list comprising nonlinearity treatment, pulse shaping and monitoring of an optical pulse if applied to the device at a particular wavelength, the method comprising:

selecting a Second Harmonic Generating (SHG) element sensitive to a fundamental harmonic (FH) defined by the particular wavelength;

selecting, by a suitable calculation, more than one relation between amplitude of the pulse to be applied to the pulse-treatment device at said wavelength and an inner optical path to be passed in the element to ensure selective obtaining of either the maximum output peak power of an outgoing pulse signal at the FH, or a non-zero peak output power of an outgoing pulse signal at the SH;

arranging input and output ports for obtaining therebetween different inner optical paths according to the selected relations.

30. The method according to claim 29, comprising the design of the element with mirror surfaces so as to form between the input and output ports at least one multi-segment trajectory resulting from internal reflections in the element.

31. The method according to claim 29 comprising, for effective pulse shaping, the selecting of the SHG element with smaller values of its mismatch parameter.

32. A system for handling optical signals, passing via optical fiber links, from the point of pulse shaping, nonlinearity treatment and/or monitoring, the system comprising two or more signal handling devices according to claim 17, inserted in one or more optical fiber links and operative to perform pulse shaping, nonlinearity treatment and/or monitoring with respect to at least one optical pulse signal.

33. The device according to claim 13, having the optical path length such that upon conveying said incoming FH optical pulse signal through said device, the output optical pulse signal at the fundamental harmonic (FH) reaches the maximal peak power, the device being thus suitable for treatment of non-linearity.

34. The device according to claim 13, having the optical path length enabling the output optical pulse signal at the second harmonic (SH) with the non-zero peak power, the device being thereby suitable for signal monitoring.

35. A device for handling an optical pulse signal in a fiber communication link, the device comprising one or more second harmonic generating (SHG) elements each being capable of performing a cascaded second harmonic generation (SHG) with respect to a particular fundamental harmonic (FH), the device being adapted to provide a selectively adjustable inner optical path for said optical pulse signal propagating via said one or more SHG elements at the fundamental harmonic (FH), for controlling phase shift accumulation in the optical pulse signal outgoing said device at said FH.

36. The element according to claim 13, having relatively small value of its mismatch parameter for effective pulse shaping.

37. A device for handling an optical pulse signal from the point of at least one of the following operations: pulse shaping, treatment of nonlinearity and signal monitoring, the device being capable of performing a cascaded second harmonic generation (SHG) with respect to a particular fundamental harmonic (FH), the device being characterized by such an optical path length selected for an incoming optical pulse signal carried by a wavelength defined by said particular fundamental harmonic (FH), that upon conveying said incoming optical pulse signal along the selected optical path, the device enables obtaining at least one output optical pulse signal from a list comprising:

an output optical pulse signal at the fundamental harmonic (FH), wherein the treatment of nonlinearity and/or the pulse shaping are performed, an output optical pulse signal at the second harmonic (SH) suitable for further monitoring and judging about said input optical pulse signal, and the device further comprising an SHG element for performing the cascaded Second Harmonic Generation, said element being covered by mirror surfaces at least at its two opposite facets and leaving at least two windows at said opposite facets for an incoming optical beam and an outgoing optical beam respectively, the arrangement being such to create one or more internal reflections of the optical beam if passing between said two windows, thereby providing an extended internal optical path.

* * * * *